(12) United States Patent
Poli et al.

(10) Patent No.: US 7,398,994 B2
(45) Date of Patent: Jul. 15, 2008

(54) ASSEMBLY FOR RETAINING AN AIRBAG MODULE TO A STEERING WHEEL

(75) Inventors: Valerio Poli, Villa Bartolomea (IT); Roberto Ridolfi, Tregnago (IT); Andrea Anselmi, Tregnago (IT)

(73) Assignee: Key Safety Systems, Inc., Sterling Heights, MI (US)

( * ) Notice: Subject to any disclaimer, the term of this patent is extended or adjusted under 35 U.S.C. 154(b) by 490 days.

(21) Appl. No.: 11/092,279

(22) Filed: Mar. 29, 2005

(65) Prior Publication Data

US 2005/0248135 A1    Nov. 10, 2005

(30) Foreign Application Priority Data

May 10, 2004   (EP) .................................. 04425334

(51) Int. Cl.
  *B60R 21/16*   (2006.01)
(52) U.S. Cl. ................. 280/731; 200/61.54; 200/61.55; 200/61.57
(58) Field of Classification Search .............. 280/728.2, 280/731; 200/61.54, 61.55, 61.57
See application file for complete search history.

(56) References Cited

U.S. PATENT DOCUMENTS

| | | | |
|---|---|---|---|
| 5,686,559 A | | 11/1997 | Cuevas |
| 5,738,369 A | * | 4/1998 | Durrani ................. 280/731 |
| 5,882,032 A | * | 3/1999 | Fischer ................ 280/728.2 |
| 6,029,992 A | * | 2/2000 | Vendely et al. .......... 280/728.2 |
| 6,119,545 A | * | 9/2000 | Hosoi et al. ............ 74/552 |
| 6,676,155 B2 | | 1/2004 | Grosch et al. |
| 6,682,092 B2 | * | 1/2004 | Schutz et al. ............ 280/731 |
| 6,830,263 B2 | * | 12/2004 | Xu et al. ............... 280/731 |
| 6,846,995 B2 | * | 1/2005 | Bonn ................. 200/61.54 |
| 7,052,035 B2 | * | 5/2006 | Kreuzer ............... 280/728.2 |
| 7,121,581 B2 | * | 10/2006 | Xu et al. ............... 280/731 |
| 2002/0074781 A1 | | 6/2002 | Derrick |
| 2005/0151354 A1 | * | 7/2005 | Sugimoto .............. 280/731 |
| 2005/0230943 A1 | * | 10/2005 | Thomas ............... 280/731 |
| 2006/0208470 A1 | * | 9/2006 | Tsujimoto et al. ........ 280/731 |

FOREIGN PATENT DOCUMENTS

| | | |
|---|---|---|
| EP | 1 281 586 A | 2/2003 |
| EP | 1 306 271 A | 5/2003 |
| EP | 1555170 A2 | 1/2005 |

* cited by examiner

*Primary Examiner*—Toan C To
(74) *Attorney, Agent, or Firm*—Lonnie Drayer

(57) ABSTRACT

An assembly of an airbag module and a steering wheel of a vehicle has the airbag module moveable between a resting position and a working position, corresponding to the actuation of the horn of the vehicle. Advantageously, the retaining assembly drives the airbag module exclusively along parallel to the axis of rotation of the steering wheel, providing constant horn activation loads.

8 Claims, 7 Drawing Sheets

ASSEMBLY FOR RETAINING AN AIRBAG MODULE TO A STEERING WHEEL

FIELD OF THE INVENTION

The present invention relates to an assembly for retaining airbag modules to steering wheels.

BACKGROUND OF THE INVENTION

Assemblies are known for installing an airbag module within a steering wheel of a motor vehicle. Airbag modules are commonly secured by pins, screws, nuts, interlocking teeth, or similar attachments, in an appropriate housing coupled to the steering wheel frame. If the airbag module serves as an ancillary device for actuation of the horn of the vehicle, the airbag module needs to be moveable between a resting position and a working position at which the airbag module co-operates with suitable devices provided within the housing for the actuation of the horn. In this case, the driver operates the horn by pressing the airbag module, directly or indirectly through a cover, into the working position. An airbag module of this type is usually supported by one or more resilient elements that return the airbag module to the resting position upon its operation.

DISCUSSION OF THE PRIOR ART

U.S. Pat. No. 6,676,155 discloses an airbag module that moves in co-operation with a support lockable with a steering wheel frame. The airbag support is concentrically surrounded by a horn ring on which electrical contacts are arranged for actuation of the horn. Springs are provided on the region of the outer periphery of the support. The support can be moved against the bias of the springs in the direction of the horn ring, to actuate the horn. Due to the restoring force of the springs, the support and the airbag module are moved back into their resting position upon actuation of the horn.

Assemblies similar to that disclosed in U.S. Pat. No. 6,676,155 are commonly provided for the installation of airbag modules within steering wheels, wherein a plurality of electrical contacts, or alternatively a horn ring, are arranged at the periphery of the airbag module for actuation of the horn, and wherein resilient members bias displacements of the airbag module. In particular, some of these assemblies provide snap coupling of the airbag module to its housing within a steering wheel or to a support element fitted to the steering wheel. Snap coupling allows an easy and quick in-line assembly of the airbag module within a steering wheel with no need for screws, pins, nuts or similar joining means. An example of snap coupling is disclosed in U.S. Pat. No. 6,676,155.

Assemblies of the prior art have several drawbacks. For example, when pressing the airbag module for actuation of the horn, due to the arrangement of the resilient members at the periphery of the airbag module, it typically tilts laterally. The driver usually pushes the airbag module, directly or through a cover, in an area on the periphery of the airbag module. The force is applied to the periphery of the airbag module, resulting in a moment that pivots the airbag module around a resilient member. In this way the airbag module slants toward the aforesaid area. For this reason, i.e. to permit lateral movement of the airbag module, relatively large gaps need to be provided between the steering wheel, or the airbag module housing, and the airbag module itself, resulting in non-aesthetic matching between these components.

Due to the aforesaid pressing of the airbag module being applicable through several push buttons, or pressing areas, uniformly arranged on the steering wheel, traditional assemblies need a plurality of electrical contacts, located around the periphery of the airbag module to permit satisfactory horn activation whatever push button/area the driver chooses. Alternatively, traditional assemblies provide a horn ring, that is a circular electrical contact surrounding the airbag module periphery. None of these designs provides equal horn activation loads between different pressing areas. This means that a driver experiences unequal horn performance, such as different duration and/or intensity, at different areas pressed on the steering wheel during activation of the horn. Pivoting of the airbag module causes lateral movements of the airbag module itself and, in this way, also causes airbag module stroke amplifications which, during assembling of the steering wheel, have to be counterbalanced by increasing the gaps between the airbag module and the steering wheel or the housing.

In view of above, assembling of steering wheels provided with traditional assemblies for installing airbag modules, which also are to activate the vehicle horn, is often time consuming and expensive.

SUMMARY OF THE INVENTION

The present invention provides a retaining assembly for airbag modules associated with steering wheels that solves the above problems of the prior art assemblies, also allowing to minimize gaps between the airbag module and the related steering wheel and to have equal horn activation loads regardless of the location on the airbag module that is pressed by the driver.

The present invention also provides a retaining assembly for airbag modules, in particular a snap-in retaining assembly, which permits in-line assembly of an airbag module in the relating steering wheel in an easy and quick way.

DETAILED DESCRIPTION OF THE INVENTION

Figure 1:
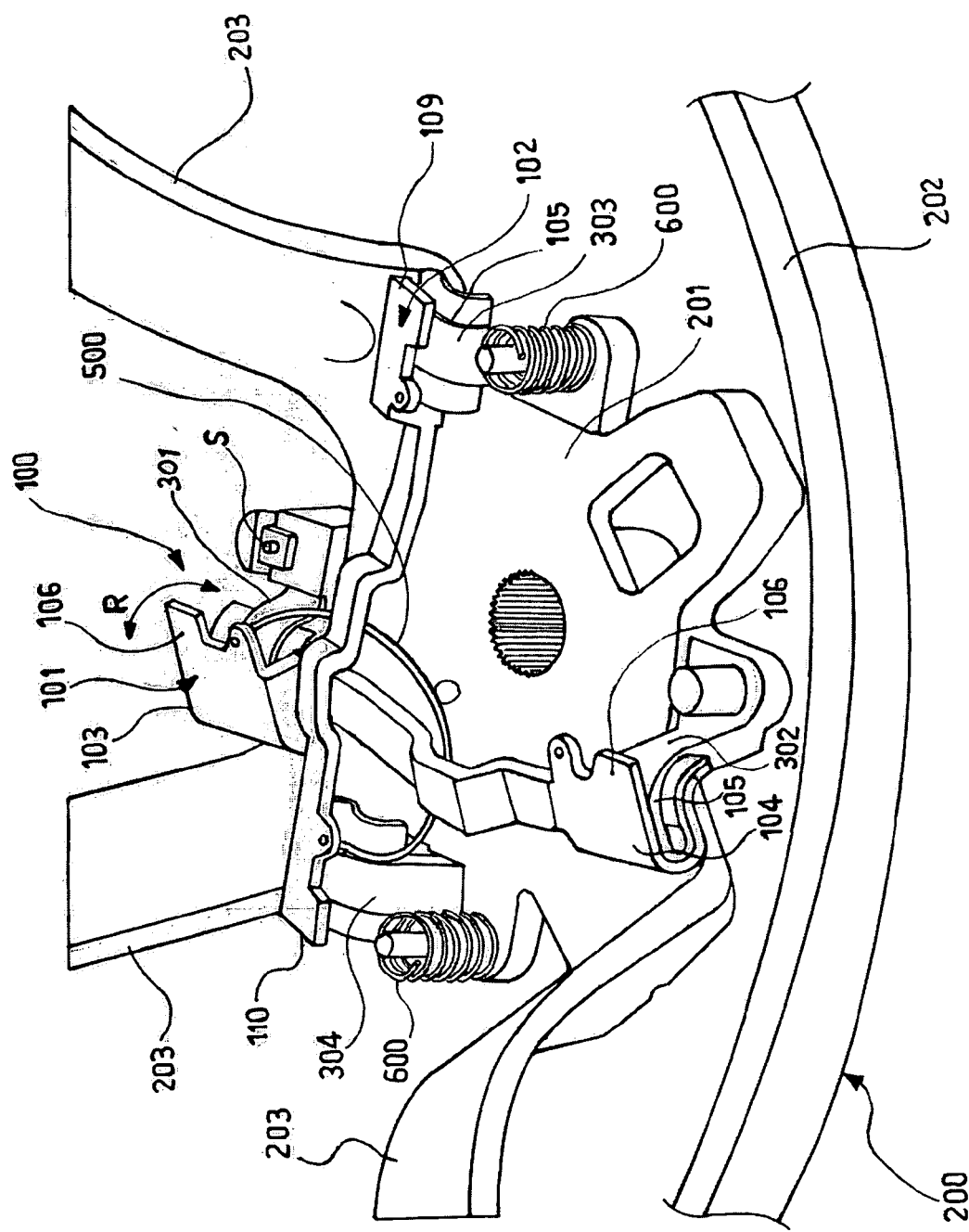
FIG. 1 is a perspective view of an embodiment of a retaining assembly according to the present invention.

FIG. 1 illustrates a retaining assembly 100 according to the present invention, provided on a steering wheel 200, in particular on the hub 201 of the steering wheel's frame, where driver airbag modules are usually mounted. Typically, the steering wheel 200 comprises a ring portion 202 connected to the hub 201 through a plurality of spokes 203.

Retaining assembly 100 can be provided directly on the hub 201 or can be mounted on a support that can be fixed to the hub 201, for example a suitable plate. The assembly 100 comprises mechanical elements for imposing, at a second side of an airbag module functionally assembled with the steering wheel 200, displacements parallel to the module axis, imparted, to a first side of the airbag module. Such mechanical elements may be of a different type, depending on various parameters as, for example, the room available in respect of the hub 201, or the airbag module size. What is important for such elements is their capacity to drive an airbag module exclusively along its axis to prevent lateral movements. As used herein and in the claims, the "module axis" or "axis of the airbag module" or similar terms are understood to mean an axis coincides with the axis of rotation of the steering wheel with which the airbag module is assembled.

In the embodiment shown in FIG. 1, the mechanical elements comprise at least a bracket 101, which is attached to the hub 201 by a hinge. The bracket can be hinged at its ends or at any suitable location. Preferably, the bracket 101 is hinged at its ends 103, 104 and pivots in the direction indicated by arrow R. The hub 201, or the support plate that eventually joins the assembly 100 to the hub 201, is provided with suitable hinges 301, 302 for pivoting of the bracket 101. The rotation angle of the bracket 101 is determined by the shape of its ends 103, 104 and by the shape of the hinges 301, 302. Attachment between the ends 103, 104 and the hinges 301, 302 is preferably detachable to allow easy assembling and disassembling of the assembly 100. Each end 103, 104 has a channel 105 that permits insertion of a hinge 301, 302, in the channel as illustrated in FIG. 1. The bracket 101 can slide laterally, as indicated by the direction T of FIG. 2, to be positively linked to the hinges 301, 302 or separated from the same. By pivoting around the respective hinges, the brackets direct the airbag module to move exclusively along its axis, from the resting position to the working position. The brackets transfer to a second portion of the airbag module only identical axial movements imparted to a first leg, each leg being engaged to an end of a single bracket. Because of movements being transmitted identically (i.e. same amount), to the diametrically opposite side of the airbag module from the one where they are imparted, the retaining assembly of the invention provides constant activation loads between different locations pushed by the driver.

The hinges 301, 302 may be coupled to the hub 201. In the shown embodiment the hinges 301, 302 are molded with the hub 201. The bracket 101 may be obtained by plate bending or molding of plastic resin or metal. If the bracket 101 is made of a flexible material that permits twisting of the bracket 101 when loaded, displacements transmitted from one end 103, 104 to the other end 103, 104 will not be identical but slightly lessened, for example to about the 60%. The bracket 101 is preferably rigid, although such a flexible material could be adopted for economic reasons.

The bracket 101 also provides a means for securing an airbag module, for example a traditional driver airbag module. Such a means for securing can be of a traditional type, i.e. screws, nuts, pins, interlocking teeth, etc. Preferably the means for securing allows snap-in attachment to the airbag module. For example, the bracket 101 is provided, at each end 103, 104, with a tab 106 that engages a suitable cavity of the airbag module. In this way, once a driver airbag module is snapped in place by the bracket 101, any movement in a direction parallel to the axis of rotation of the steering wheel made on a side of the airbag module in correspondence of end 103, causing its rotation is equally transmitted to the diametrically opposite side of the airbag module by the end 104.

To avoid airbag module rotation around the bracket 101, the assembly 100 may provide suitable guides, bearings, etc. The location of such mechanical means can be arranged to meet assembling needs or customer's requests. In the preferred embodiment, the assembly 100 includes a second bracket 102 that is mounted in a crossing or intersecting orientation with respect to the first bracket 101, as shown in FIGS. 1-7. In this way a driver airbag module 400 (FIG. 3) can be driven by the assembly 100 exclusively in a direction parallel to the axis of rotation Z of the steering wheel, with no possibility for the airbag module 400 to tilt laterally.

Alternatively, the two brackets 101, 102 may be arranged in triangular shape or one bracket can be "Y" or "Δ" shaped to have three points of engagement with the steering wheel frame. For example brackets may provide attachment to the airbag module in three points, by sharing a coupling point through a spherical hinge.

Figure 2:
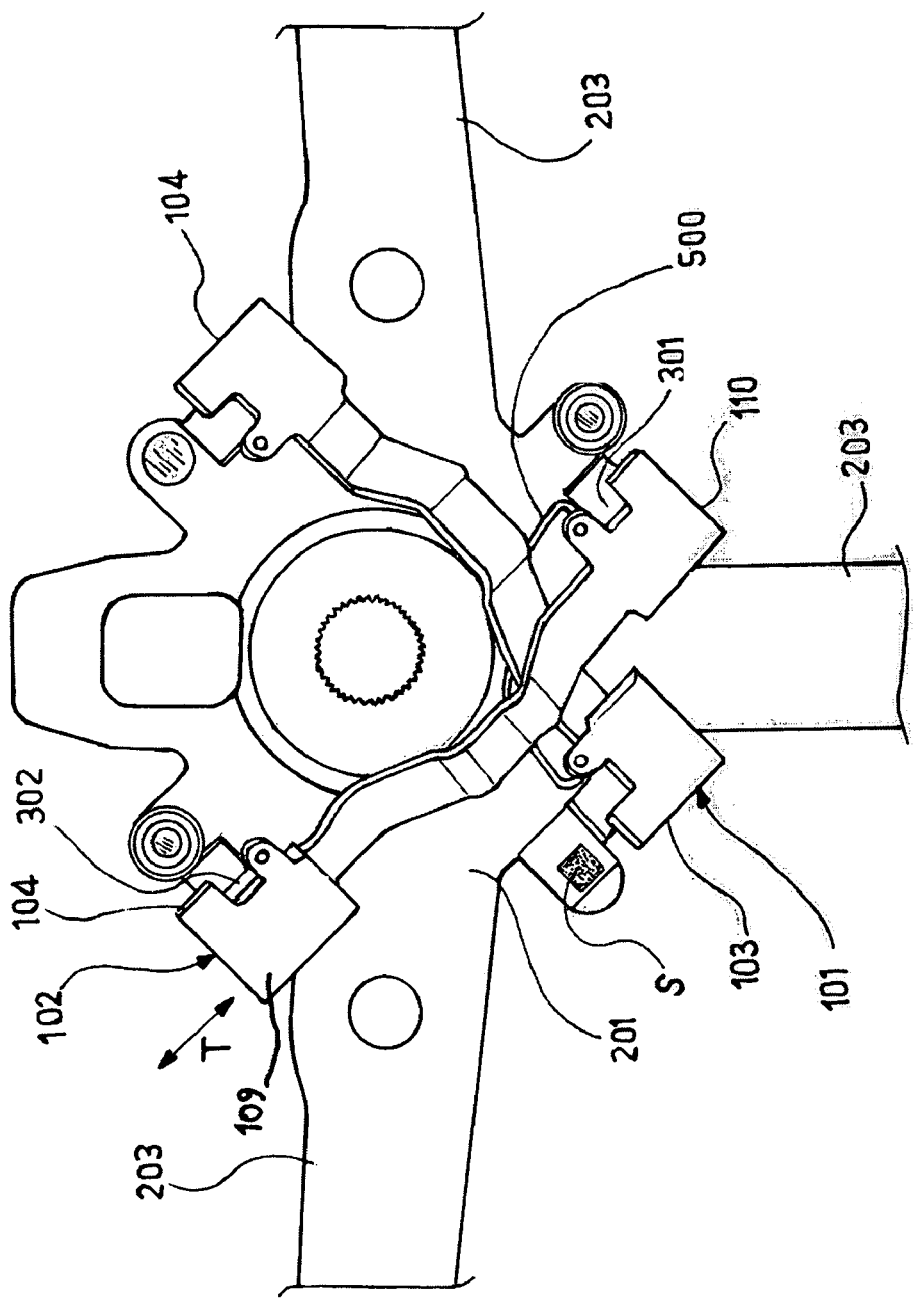
FIG. 2 is a top view of the assembly of FIG. 1.
Figure 3:
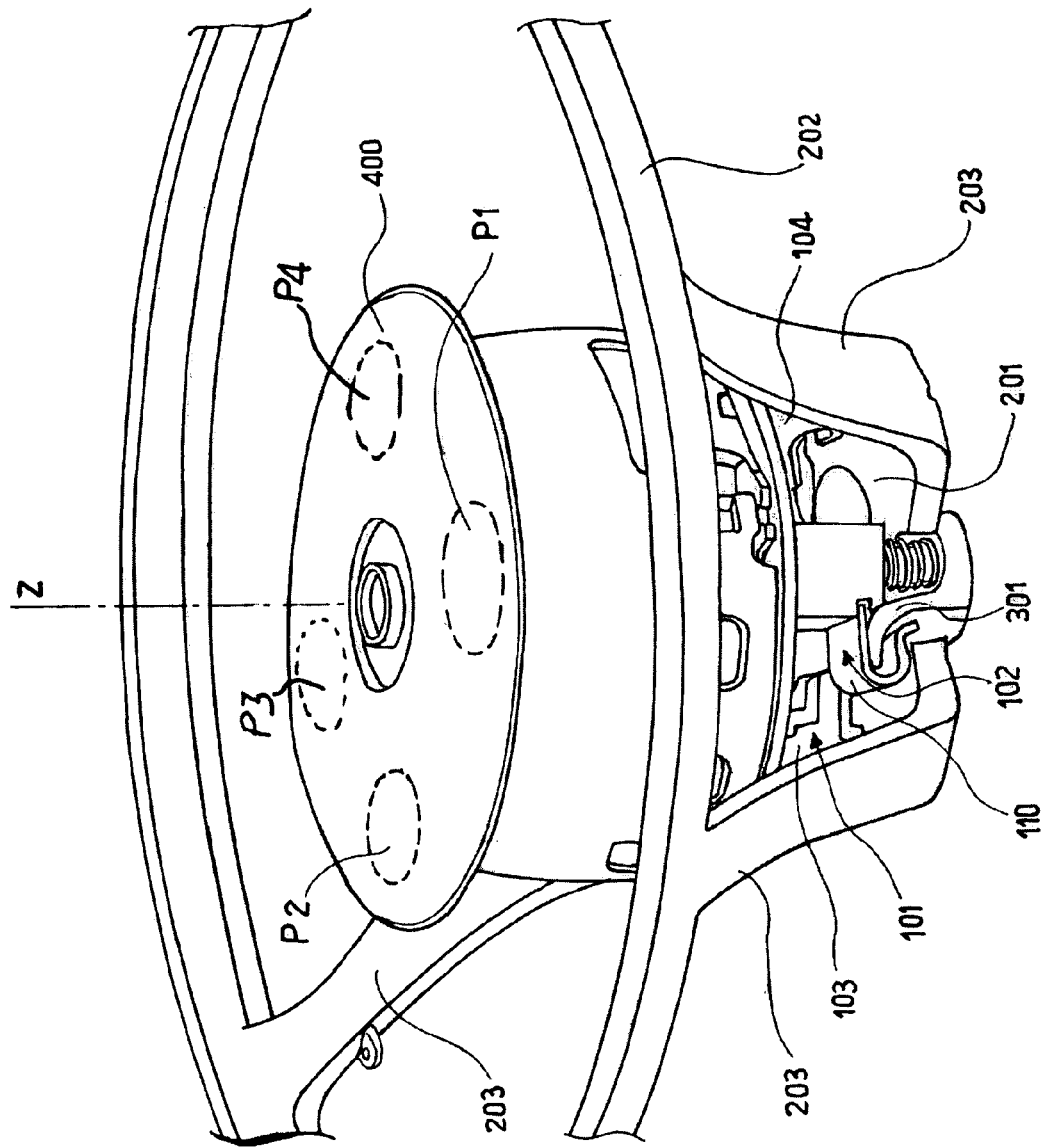
FIG. 3 is a perspective view of an airbag module installed on a steering wheel by the retaining assembly of FIG. 1.

Considering now FIGS. 1-3, if the driver pushes the driver airbag module 400 in a first location designated as P1, a force is transmitted which causes the airbag module 400 to move from its resting position toward the hub 201. Consequently a displacement will be imparted to the end 110 of the second bracket 102. At this point, a traditional retaining assembly will exhibit tilting of the driver airbag module 400 toward the pushed side. Any force a driver may impart, directly or through a cover, on a first portion of the airbag module near a first end of the bracket, is transmitted by the bracket to its second end, i.e. to a second portion of the airbag module diametrically opposite of the first on the length of the bracket. The assembly 100 directs the driver airbag module 400 in a direction parallel to the axis of rotation Z of the steering wheel due to the displacement imparted at the end 110 of the bracket 102 being equally or uniformly transmitted both to the end 109, which engages a second location P3 of the airbag module 400 diametrically opposite to that corresponding to the location P1, and to the ends 103, 104 of the bracket 101 (corresponding to locations P2 and P4), which also engage the airbag module 400. During operation of the assembly 100, the brackets 101, 102 pivot on respective hinges 301, 302, 303, 304, allowing the airbag module 400 to move parallel to the axis of rotation Z of the steering wheel and reach its working position corresponding to the actuation of the horn of the vehicle provided with the steering wheel 200. Operation of the assembly 100 does not change if the driver pushes a location P2 at a different location on the airbag module 400. Only components of movements in a direction parallel to the axis of rotation of the steering wheel imparted to a side of the airbag module 400 will be equally or uniformly transmitted by the brackets 101, 102 to the diametrically opposite side of the same airbag module 400 with respect to the axis of rotation of the steering wheel. Once the horn has been activated, the driver airbag module 400 is returned to its resting position by one ore more resilient elements. In the illustrated embodiment the resilient elements are two springs 600. Advantageously, only those movements along the airbag module axis, initially imparted to a portion of the airbag module itself, are shifted to a second portion of the airbag module substantially diametrically opposite to the first portion, this preventing the airbag module from tilting while being pressed by a driver for the activation of the horn.

The assembly according to the invention provides constant horn activation loads, i.e. the loads necessary to close the electrical circuit controlling the horn, which means that a driver experiences equal horn performances (same duration and/or intensity) at different points pressed on the airbag module during activation of the horn. In view of the airbag module 400 being axially driven, whatever location the driver may push on the airbag module 400, it will provide consistent horn performance. There is a correlation between a given displacement imparted to the airbag module 400 by the driver and intensity and duration of a horn stroke, without alteration of its performances being caused by tilting of the airbag module 400. The possibility of failures in activating the horn by a driver are reduced and there is no need for large gaps in the steering wheel cover to accommodate airbag module movements.

The assembly 100 provides a means for preventing the brackets 101, 102 from disengaging from the hinges 301, 302, 303, 304. As shown in FIGS. 2 and 3, the brackets 101, 102 may be connected by a resilient element 500 that retains the ends 103, 104, 109, 110 of the brackets in position. In particular, the resilient element 500 is a wire spring attached, in a removable way, to the ends 103, 110 of the brackets. To disassemble the assembly 100, it is sufficient to remove the wire spring 500, and to slide each bracket 101, 102 along its axis (direction T of FIG. 2) at a position corresponding to disengaging of the channel 105 from the respective hinge 301, 302, 303, 304.

Because the driver airbag module 400 is driven only in a direction parallel to the axis of rotation of the steering wheel, only one electrical contact is needed for horn actuation. This greatly simplifies pre-assembling of the steering wheel and reduces costs. Moreover, for the same reasons, the assembly can operate with only a single resilient member, for example a spring. The electrical contact may be of any known type. Preferably the assembly 100 provides a single switch S, located on the periphery of the hub 201, (see FIG. 1) in correspondence to the travel height of the airbag module 400. During horn actuation, the switch S is pressed by the airbag module 400 to actuate the vehicle horn.

Figure 4:
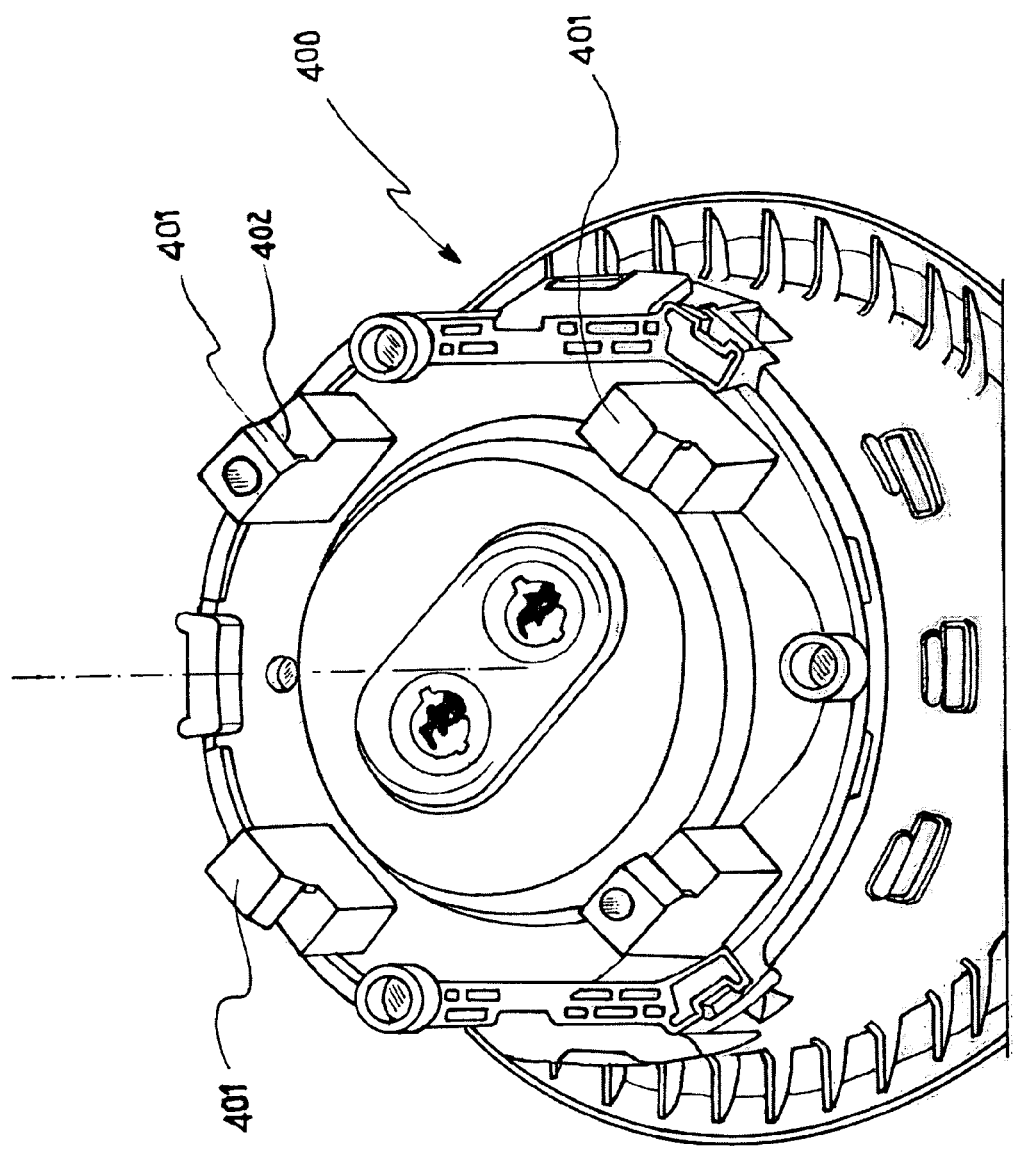
FIG. 4 is a perspective view of an airbag module compatible to the assembly of FIG. 1.
Figure 5:
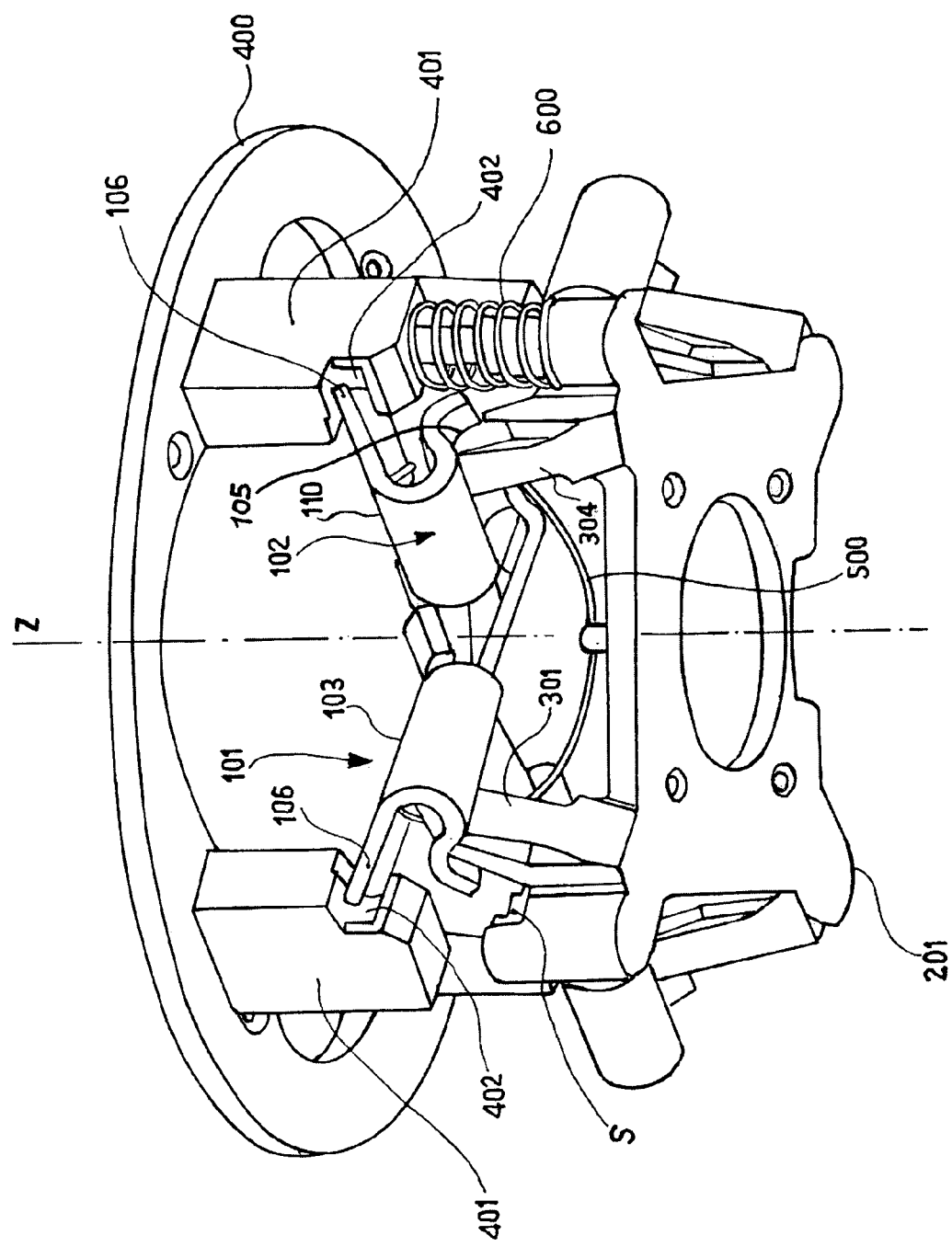
FIG. 5 is a perspective view of the retaining assembly of FIG. 1 while snapping in the airbag module of FIG. 4.
Figure 6:
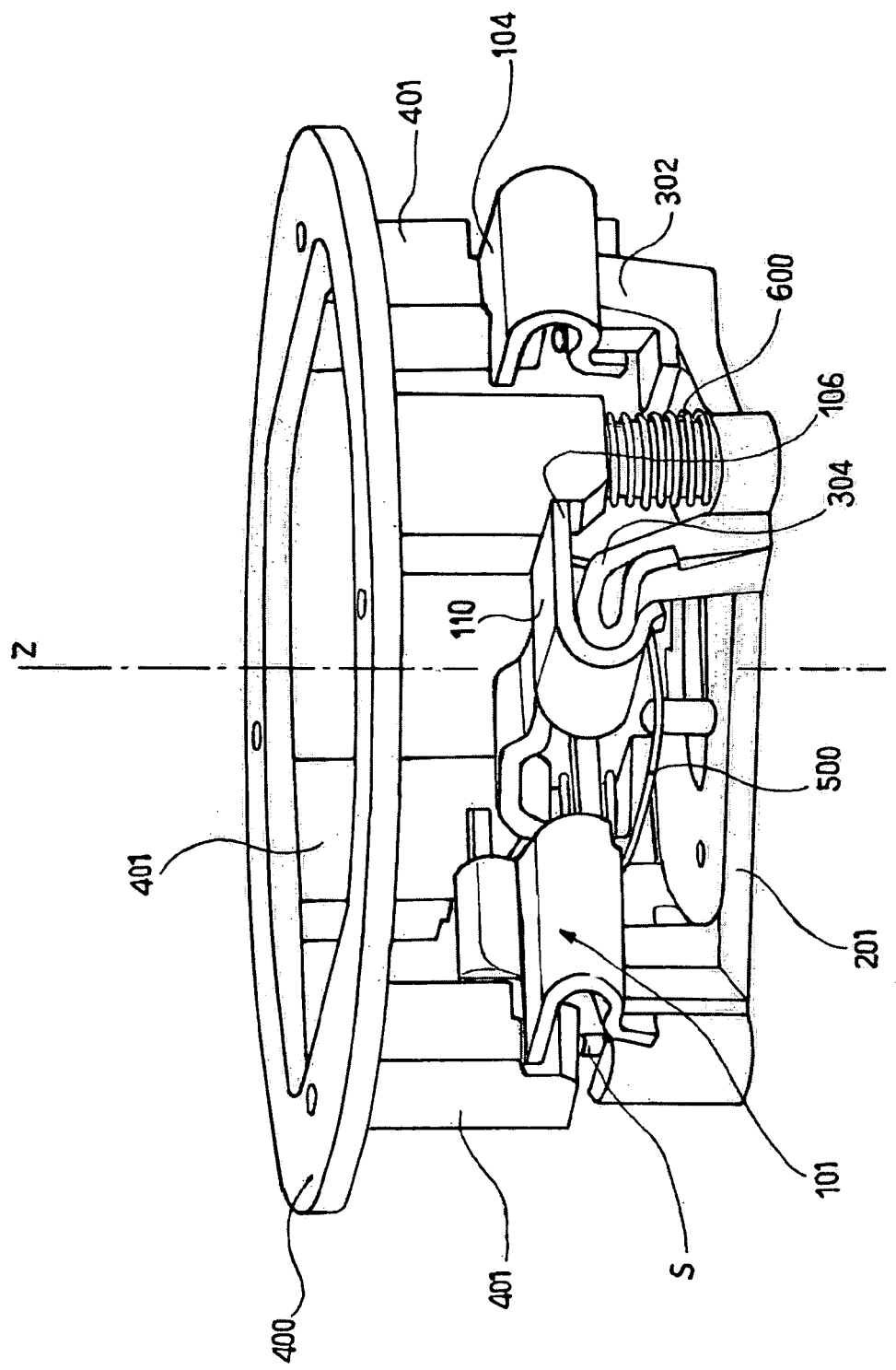
FIG. 6 is a perspective view of the airbag module of FIG. 5 in its resting position.
Figure 7:
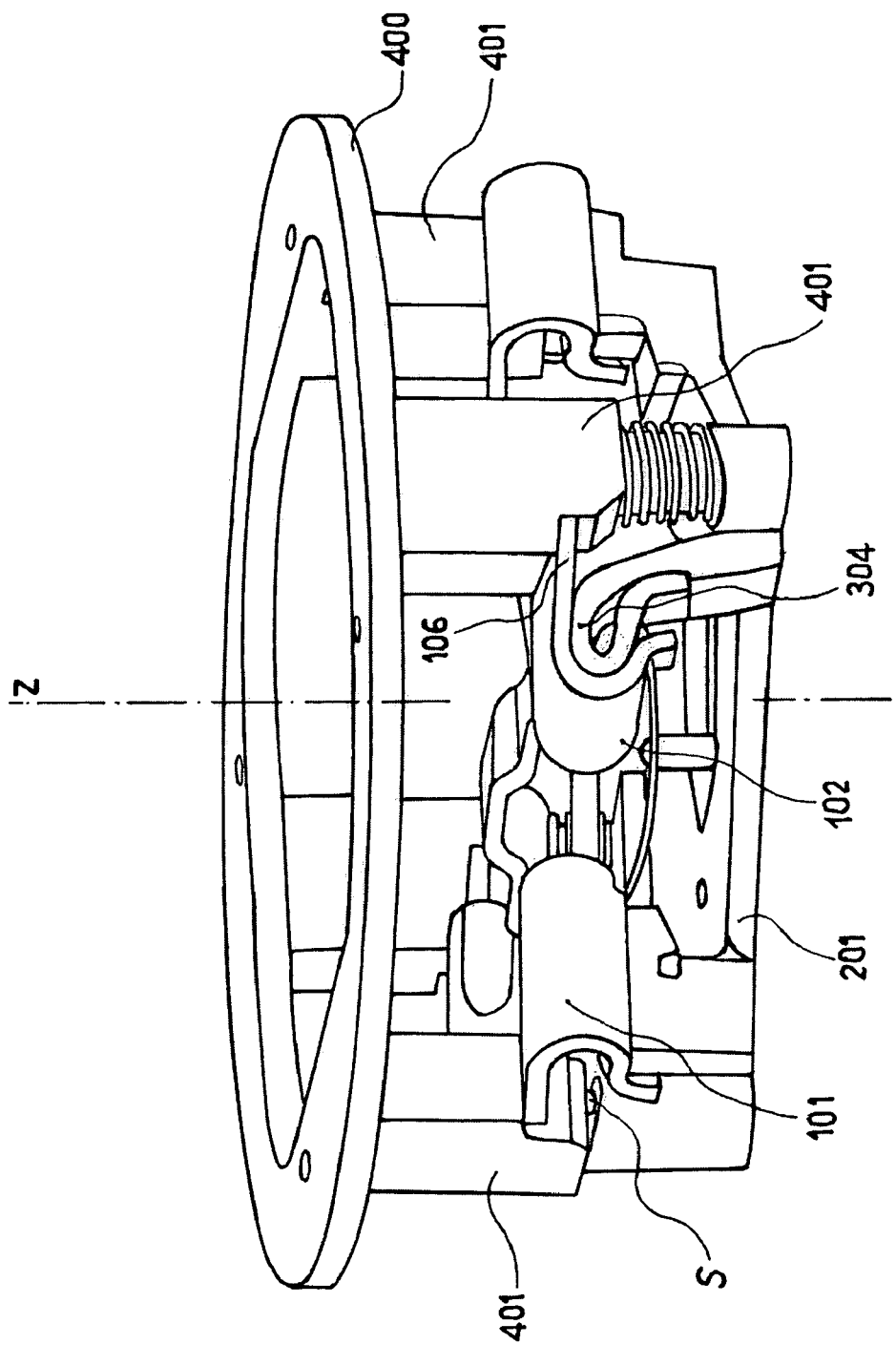
FIG. 7 is a perspective view of the airbag module of FIG. 5 during horn activation.

The retaining assembly according to the invention can be applied to many different types of airbag modules, regardless of their shapes. FIG. 4 shows a particular driver airbag module 400 that can be easily retained by an assembly 100. The airbag module 400 provides, at its bottom, a plurality of legs 401. Preferably each leg 401 is located so to overlay one of the ends 103, 104, 109, 110 of the brackets when the airbag module 400 is coupled to the assembly 100. FIG. 5 schematically illustrates how the airbag module 400 (only its bottom is shown) can be snapped into the assembly 100. At a first moment each leg 401 is put into contact with a tab 106 of an end 103, 104, 109, 110 of a bracket, in such a way that the tab 106 is aligned with a suitable groove 402 provided on the legs 401. By pushing the airbag module 400 toward the hub 201, the tabs 106 snap into the groves 402 retaining the airbag module 400 in its resting position, as illustrated in FIG. 6. In this position the airbag module 400 is ready to be pressed by the driver for activation of the horn, directly or through a covering. FIG. 7 illustrates the airbag module 400 in its working position, corresponding to the switch S being operated by a leg 401, i.e. to the horn actuation.

While engaging the airbag module 400 with the assembly 100, i.e. while pushing the airbag module 400 so that the tabs 106 enter the grooves 402, the brackets 101, 102 are first pivoted downward toward the hub 201. The brackets 101, 102 can then slide along their axes (see direction T of FIG. 2 for bracket 102) to misalign the channels 105 with respective hinges 301, 302, 303, 304. Sliding of the brackets 101, 102 is automatically carried out by the resilient element 500, i.e. by the wire spring. In this position the brackets 101, 102 cannot pivot upwardly over the airbag module 400 resting position. The wire spring 500 or any other suitable means will keep the brackets 101, 102 in position to avoid incidental disengagement of the airbag module 400.

Disengagement of the driver airbag module 400 can be accomplished by sliding each bracket 101, 102 along its axis, overcoming the resistance of the resilient element 500, until the channel 105, provided on each bracket end 103, 104, 109, 110, is aligned with the respective hinge 301, 302, 303, 304. In this position the brackets 101, 102 can rotate (see direction R of FIG. 1 for bracket 101) upwardly over the airbag module 400 resting position until each tab 106 exits the respective groove 402 to permit separation of the airbag module 400 from the steering wheel hub 201.

The assembly 100 may provide a traditional attachment with the related driver airbag module, different from the disclosed one. The disclosed attachment requires no screws, pins or other means that make the airbag module 400 assembly more complicated or time consuming. It is a feature of the invention to provide an easy in-line assembly that can be accomplished, for example at the assembly line of the vehicle, simply by inserting the airbag module 400 onto the hub 201 and pressing until the brackets 101, 102 snap on airbag module 400.

According to an alternative embodiment of the present invention, the assembly 100 may provide brackets 101, 102 hinged to the driver airbag module 400 and grooves 402 arranged on the steering wheel hub 201. Such an embodiment provides an easy in-line assembly of the airbag module 400 onto the steering wheel 200.

Put another way in accordance with the assembly of an airbag module 400 and a steering wheel 200 of a vehicle disclosed herein there is a means for coupling the airbag module to the steering wheel frame 201 such that the airbag module is moveable between a resting position and a working position corresponding to the actuation of a horn of the vehicle, the assembly having only one switch to activate the horn S1, the airbag module being movable parallel to the axis of rotation of the steering wheel such that for any location on the airbag module where a depressing force is applied the operation of the horn is substantially the same.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An assembly of an airbag module and a steering wheel, the steering wheel having a frame, the assembly comprising:
   a means for coupling the airbag module to the steering wheel frame, the airbag module being moveable between a resting position and a working position corresponding to the actuation of a horn of the vehicle;
   at least one resilient member interposed between the airbag module and the steering wheel frame for returning the airbag module to the resting position upon activation of the horn;
   the means for coupling comprising a first bracket and a second bracket that is mounted in a crossing or intersecting orientation with respect to the first bracket, each bracket having a pair of ends, the first bracket engaging only a hub of the steering wheel frame or a support plate that joins the means for coupling to the hub of the steering wheel frame via a first pair of hinges, the second bracket engaging only a hub of the steering wheel frame or a support plate that joins the means for coupling to the hub of the steering wheel frame via a second pair of hinges, for pivoting of the brackets for engaging the steering wheel frame with the airbag module, wherein the airbag module can be driven exclusively in a direction parallel to the axis of rotation of the steering wheel;
   and a means for securing the airbag module to the means for coupling.

2. The assembly of an airbag module and a steering wheel according to claim 1, wherein the hinges are located at the ends of the brackets.

3. The assembly of an airbag module and a steering wheel according to claim 2, wherein the brackets are connected by a resilient element that retains the ends of the brackets in position.

4. The assembly of an airbag module and a steering wheel according to claim 1, wherein the brackets are connected by a resilient element that retains the ends of the brackets in position.

5. The assembly of an airbag module and a steering wheel according to claim 1, wherein the two brackets are arranged substantially perpendicular to the axis of rotation of the steering wheel and are hinged at their ends.

6. The assembly of an airbag module and a steering wheel according to claim 5, wherein the brackets are connected by a resilient element that retains the ends of the brackets in position.

7. An assembly of an airbag module and a steering wheel, the steering wheel having a frame, the assembly comprising:

a means for coupling the airbag module to the steering wheel frame, the airbag module being moveable between a resting position and a working position corresponding to the actuation of a horn of the vehicle, the airbag module having a bottom with a plurality of legs extending therefrom, the legs provided with grooves;

at least one resilient member interposed between the airbag module and the steering wheel frame for returning the airbag module to the resting position upon activation of the horn;

the means for coupling comprising a first bracket and a second bracket that is mounted in a crossing or intersecting orientation with respect to the first bracket, each bracket having an end with a tab, each tab engaging the groove of one of the legs extending from the bottom of the airbag module thereby engaging the steering wheel frame with the airbag module, wherein the airbag module can be driven exclusively in a direction parallel to the axis of rotation of the steering wheel.

8. The assembly of an airbag module and a steering wheel according to claim 7, wherein the brackets are connected by a resilient element that retains the ends of the brackets in position.

* * * * *